United States Patent [19]
Hughes et al.

[11] 4,445,170
[45] Apr. 24, 1984

[54] COMPUTER SEGMENTED MEMORY MANAGEMENT TECHNIQUE WHEREIN TWO EXPANDABLE MEMORY PORTIONS ARE CONTAINED WITHIN A SINGLE SEGMENT

[75] Inventors: Ronald P. Hughes, Santa Clara; Douglas G. Swartz, Cupertino; Bruce E. Weiner, Palo Alto, all of Calif.

[73] Assignee: Zilog, Inc., Campbell, Calif.

[21] Appl. No.: 245,483

[22] Filed: Mar. 19, 1981

[51] Int. Cl.³ .............................................. G06F 3/00
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,510,847 | 5/1970 | Carlson | 364/200 |
| 3,787,813 | 1/1974 | Cole | 364/200 |
| 4,037,215 | 7/1977 | Birney | 364/200 |
| 4,177,510 | 12/1979 | Appell | 364/200 |
| 4,268,903 | 5/1981 | Miki | 364/200 |

OTHER PUBLICATIONS

*Z8010 MMU Memory Management Unit, Product Specification-Preliminary,* Zilog, Inc., Cupertino, Oct. 1979.
*Z8010 MMU Memory Management Unit, Technical Manual-Preliminary,* Zilog, Inc., Cupertino, Oct. 1980.
*Z8000 PLZ/ASM, Assembly Language Programming Manual,* Zilog, Inc., Cupertino, Apr. 1979, pp. iii, v–ix, 1-1 to 1-14.

*Primary Examiner*—Raulfe B. Zache
*Attorney, Agent, or Firm*—Majestic, Gallagher, Parsons & Siebert

[57] ABSTRACT

Separate memory management units are described for use with a central processing unit to separately control expanding stack and data memory portions within a single logical memory segment. The stack and data portions are prevented from expanding into each other by a break register which contains an address between the two memory portions and is updated as the stack and data memory portions expand and contract. The stack memory management unit only is enabled when a portion of the memory is addressed on one side of the break value while the data memory management unit only is utilized when the address is on the other side of the break value.

11 Claims, 2 Drawing Figures

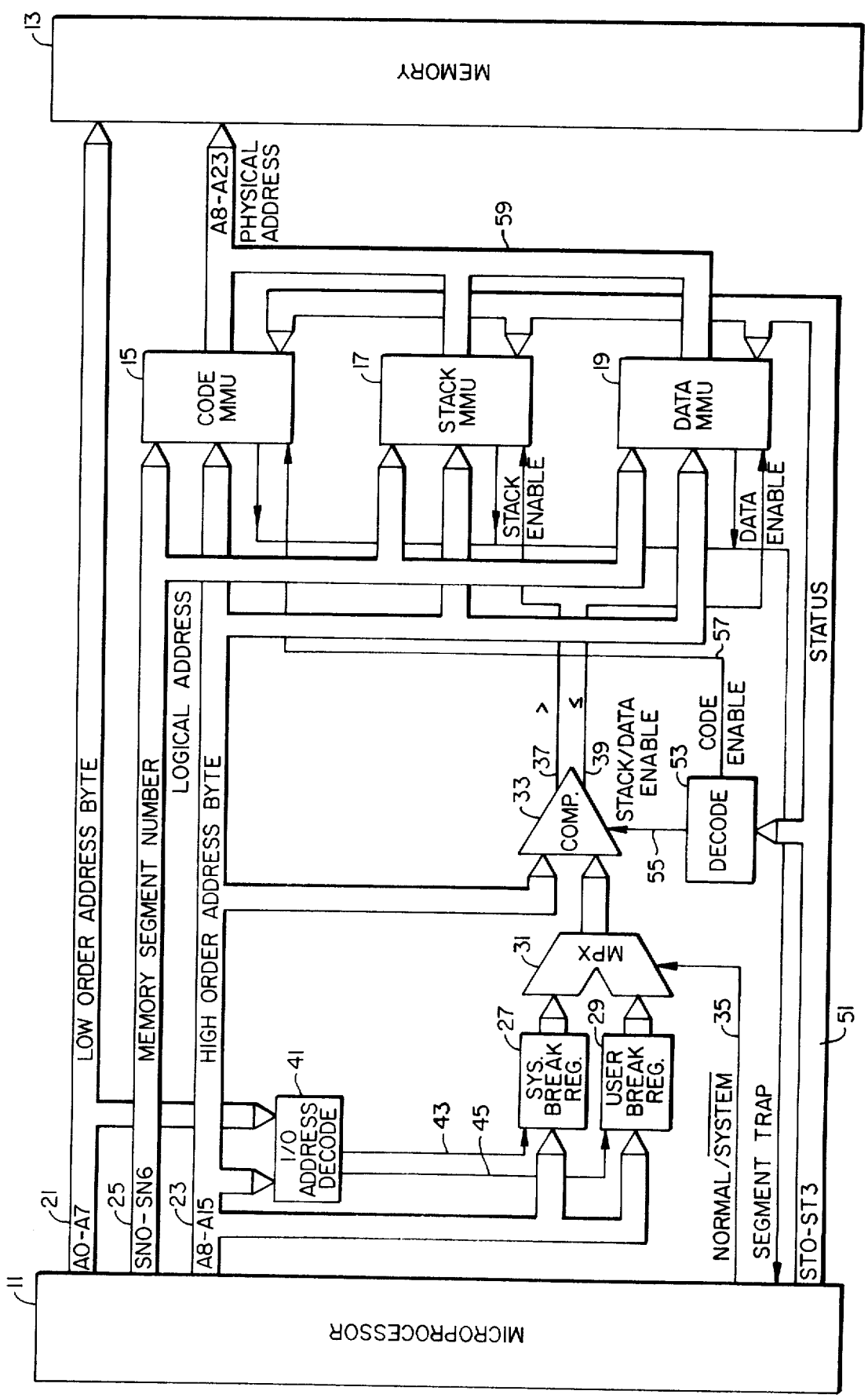
FIG._1.

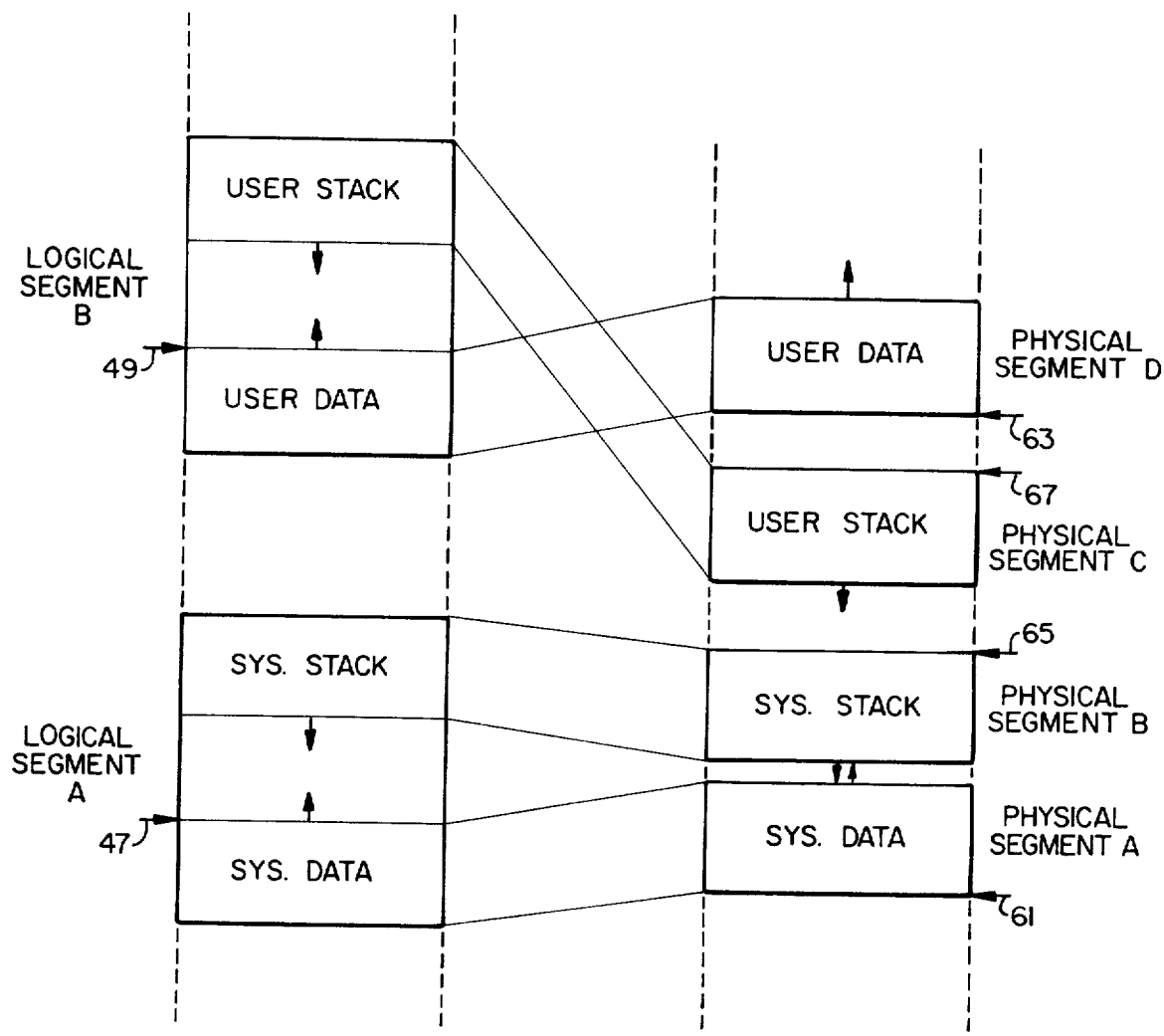
FIG._2.

COMPUTER SEGMENTED MEMORY MANAGEMENT TECHNIQUE WHEREIN TWO EXPANDABLE MEMORY PORTIONS ARE CONTAINED WITHIN A SINGLE SEGMENT

BACKGROUND OF THE INVENTION

This invention relates generally to computer and microcomputer systems structure, particularly to a circuit technique for managing the computer system memory.

It is a common goal in any computer system, particularly in a microcomputer system, to minimize the amount of random access memory (RAM) that is required since memory elements are an expensive part of any system. At the same time, it is a goal of any computer structure to provide flexibility in programming so that the limitations on memory size do not create added problems for the programmer. As a result, a technique has been employed of using a separate memory management unit (MNU) disposed between the microprocessor or other central processing unit (CPU) and the RAM. Use of the MMU allows the program to call for data in the memory at "logical" addresses that are converted by it to "physical" memory addresses where the data actually resides. The physical memory actually allocated is generally much less than the logical memory assumed to be available by the program. Thus, the MMU is an important element in efficiently using the physical memory available to carry out the software operations commanded of the system.

As a particular example of such a system, the Z8001 microprocessor available from Zilog, Inc. is utilized with one or more Zilog Z8010 MMU memory management units. This particular microprocessor designates on a segment bus one of 128 different logical memory segments in which a particular location within the segment is designated on an address bus. Each of the 128 segments may have up to 64 K bytes of memory. The MMU may be utilized to control the size of each segment of the memory in increments of 256 bytes. The MMU contains a register for each of 64 memory segments that designates for the physical memory the actual beginning address of each physical segment as well as the size of that segment. The MMU's ability to control that size is useful for stack or variable size data memories. A variable stack memory size, for example, would occupy one of the 128 logical memory segments, resulting in eliminating usable logical memory within that segment that is outside the size of the stack.

It is a primary object of the present invention to provide an improved memory management system that better utilizes the available logical and physical memory space.

SUMMARY OF THE INVENTION

Briefly, the improvement of the present invention utilizes two separate memory management units that are operated one at a time to control the same logical memory segment. Each of the portions of the memory segment controlled by each of the MMU's can be expanding, thus making it possible to provide an expanding stack and an expanding data memory within a single logical memory segment. Overlapping of these two memory portions is prevented by a break register that contains an address within the segment that divides the two portions, one of the MMU's being enabled in response to a particular address access command from the CPU depending upon whether that address is above or below the break address value stored in the register. This break value may be updated to reflect the changing relative sizes of the memory portions. By being able to include two variable size memory portions within a single logical memory segment, more of the limited physical memory is then available to the programmer for other uses.

Other advantages, objects and features of the various aspects of the present invention are set forth in connection with the following description of their preferred embodiments, which should be taken in conjunction with the accompanying drawings.

BRIEF DESCRIPTION OF THE DRAWINGS

FIG. 1 is a block schematic diagram of a memory management circuit improvement according to the present invention; and FIG. 2 illustrates both logical and physical memory utilization by the circuit of FIG. 1.

DESCRIPTION OF THE PREFERRED EMBODIMENT

FIG. 1 shows in block diagram form the schematic diagram of a computer system utilizing the circuit improvements of the present invention. In this example, the micro computer system is shown wherein the central processing unit is a microprocessor 11 available as a single integrated circuit from Zilog, Inc., its Z8001 microprocessor. The microprocessor communicates with a semiconductor RAM 13 of a standard type. The computer system would normally operate in conjunction with some magnetic media memory, such as floppy discs or tape, but this is not shown in FIG. 1. The portion of a complete computer system shown in FIG. 1 is that which allows the microprocessor 11 to address particular portions of the memory 13. In that connection, three Z8010 memory management units 15, 17 and 19 are employed. Other portions of a complete computer system, such as data paths and elements for manipulating data, are not shown but are well known.

There are many publications available which describe the structure and use of the commercially available microprocessor and memory management units of Zilog, Inc. Examples of this are manuals available from Zilog, Inc. itself. Two such manuals relating to the Z8001 microprocessor and associated circuits are the "Z8000 CPU Technical Manual" dated August, 1980 and the "Z8000 PLZ/ASM Assembly Language Programming Manual" dated April, 1979. A copy of pages 1—1 through 1-14 of the latter identified manual is reproduced as Appendix II hereto. The memory management units are described to some extent in those publications and in more detail in the following two publications: "Z8010 MMU Memory Management Unit, Product Specification", October, 1979, and "Z8010 MMU Memory Management Manual, Technical Unit," dated October, 1980. These four publications are expressly incorporated by reference herein.

This particular type of microprocessor 11 includes a 16 bit address bus, the least significant bits being carried by a bus 21 and the most significant bits being carried by a bus 23, the address bus being shown as these two separate buses for ease of explanation. In addition, the microprocessor has a memory segment bus 25. The left hand column of FIG. 2 shows a representation of the two of the available 128 logical memory segments that can be accessed individually by the appropriate code on the memory segment bus 25. The two logical segments designated as "A" and "B" in FIG. 2 are shown for explanation purposes. The microprocessor 11 views the memory 13 as if it contained 128 such segments, each up to 64 K bytes in size, but the physical memory 13 may contain less or a large memory will be accessed by several different users, thus making only a portion of it available to a given microprocessor. The memory address manipulations on the left hand side of the three MMU's of FIG. 1 are expressed in logical addresses, as shown in the left hand column of FIG. 2, while the addresses on the right hand side of the three MMU's are expressed as actual memory physical addresses, as shown in the right hand column of FIG. 2.

Although the same commercially available MMU element is utilized for each of the MMU's 15, 17 and 19, their function is quite different. It is common practice to use a separate code MMU 15 that controls a certain number of the logical memory segments for the operating system program, user programs and like computer system control software. Other of the available logical segments are used for data storage, stack memory, and other similar purposes, that are all controlled by a second MMU. According to the present invention, however, the function of the second MMU as commonly used is performed by two separate MMU's 17 and 19, the former to control a stack and the latter to control the data portions of logical memory with a single logical segment. Both of the stack and data portions of the logical segment are expandable, and it is the purpose of the remaining portions of the system of FIG. 1 between the microprocessor and the three MMU's to control the MMU's 17 and 19 in order to prevent overlapping of the expanding data and stacked memory portions within a single logical segment. FIG. 2 shows a representation of two such logical segments "A" and "B", each will separate data and stack memory portions that are expandable toward each other.

The control logic for the MMU's 17 and 19 includes as principal elements, a system break register 27 and a user break register 29, a multiplex circuit 31 and a comparator 33. The multiplex circuit 31 is simply a switch under control of a signal level in a circuit 35 that is connected to one pin of the microprocessor 11. That pin emits a signal that identifies when a "normal" or "user" memory portion is being utilized, in which case the user register 29 is connected by the circuit 31 to one of the two inputs of the comparator 33. A different signal level in the line 35 denoting when a "system" portion of the memory is to be accessed causes the system register 27 to be connected by the multiplex circuit 31 to that input of the comparator 33. The second input of the comparator 33 is the high order portion 23 of the address bus. When that portion of the address bus contains an address higher than that of the register connected to the other input of the comparator 33, a signal is emitted in a line 37 which causes the stack MMU 17 to be operable. On the other hand, when that portion of the address is equal to or less than that of the register 27 or 29 that is connected to the other comparator input by the switch 31, a signal is emitted in a line 39 that causes the data MMU 19 to be operable. Thus, only one of the MMU's 17 and 19 is enabled at any one time.

Referring to FIG. 2, the address in the break register 27 is adapted for use when memory logical segment "A" is being accessed. The decision whether the addresses within the system stack or the system data portions of segment "A" are being accessed are made by the comparator 33 and its output control signals. Similarly, the user register 29 contains an address for use with the memory logical segment "B". The stack MMU 17 has one of its 64 segment descriptor registers devoted to logical segment "A" and another of the registers devoted to logical segment "B". The MMU begins with a reference logical address at the top of the segment and expands downward to provide stack size as required, according to the normal operation of an MMU when used to control the stack. The stack portions of the logical segments "A" and "B" are controlled independently by the MMU 17 because different segment registers within the MMU are used for each. In a similar manner, the data MMU 19 controls the data portions of the two logical segments "A" and "B" of FIG. 2 by separate segment or registers.

The values in the break registers 27 and 29 are set to define a demarcation between the stack and data portions of their respective logical segments. These registers could contain fixed values for an address between these portions, but it is preferred to update these registers to contain an address within their respective segments that will always define a separation between the two no matter what their relative sizes or how they expand or contract. Accordingly, each of the break registers 27 and 29 is connected to the higher order address portion 23 of the address bus so that the higher order address byte can be entered into either of the registers at an appropriate time. The controlling of the entry of these values into the registers 27 and 29 provided by input/output (I/O) address decoding circuit 41. The registers 27 and 29 are assigned unique I/O addresses for access from the microprocessor and the circuits 41 emit an enabling signal in a circuit 43 when the system break register 27 is being accessed and a signal in a circuit 45 when the user break register 29 is being accessed.

The circuit of FIG. 1 is designed to preferably be operated so that the break register 27 contains an address corresponding to that indicated at 47 of FIG. 2, the address at the edge of the data register within the logical segment "A". Similarly, the user break register 29 preferably contains an address corresponding to that indicated at 49 of FIG. 2 for the logical segment "B". Thus, as the MMU's expand and contract the size of the data portion of the logical segments, the microprocessor operating system preferably also updates the corresponding break register. The edge of the data portion is utilized, rather than the edge of the stack portion of the logical segment, since the data portion in most applications will expand or contract at a slower rate than will the stack portion. In operation, any access by the microprocessor 11 of the logical segment "A" having an address greater than that indicated at 47, for example, will enable the stack MMU 17. An address less than or equal to that indicated at 47 will enable the data MMU 19.

A portion of an operating system designed for the Z8001 microprocessor and Z8010 MMU in the circuit of FIG. 1 is given in the attached Appendix. This portion causes the value in the break registers 27 and 29 to be updated as the data portion of the designated segments expands or contracts. The coding of the Appendix is partially in assembly language and partially in the C language.

Standard status lines 51 are connected between the microprocessor 11 and each of the MMU's 15, 17 and 19 in a normal manner. A decoding circuit 53 is also connected to these lines and determines from the microprocessor when a data portion of the memory is to be accessed, in which case an appropriate enabling signal is emitted in a line 55, or when a code portion of the memory is being accessed, in which case an appropriate enabling signal is emitted in a line 57. As mentioned before, the code MMU 15 does not access any of the same logical segments that are accessed by the stack or data MMU's 17 and 19. At any one instant, only one of the three MMU's is being utilized.

The MMU conversion of logical addresses at the input to the left side of FIG. 1 into physical addresses at an output bus 59 is accomplished in a usual manner. What is not usual is that the use of separate stack and data MMU 17 and 19 makes possible the independent treatment of each of the four different logical segment data and stack memory areas. As shown in FIG. 2, the physical addresses for each of the system data, system stack, user stack and user data portions is independent, thus allowing greater flexibility within the standard operating system for maximum utilization of the limited physical memory. In operation, the segment descriptor register within the data MMU 19 that responds to the logical segment "A" code of the memory segment bus 25 contains a beginning physical address 61 of the physical segment "A" as illustrated in FIG. 2. Similarly, the segment descriptor register within that MMU that responds to the logical segment "B" contains a beginning address 63. In both cases, the respective registers of the MMU 19 contains information as to the size of the physical segments. Similarly, the stack MMU 17 in its two of the segment descriptors that independently responds to the logical segment "A" or "B" in the memory segment bus 25 contain stack starting physical addresses 65 and 67, respectively.

memory segment on an address bus, a system for managing physical memory of said computer system, comprising:

first and second memory management units each having an input connected to said segment bus and to at least a most significant portion of the address bus, each of said memory management units being characterized by generating at an output connected to a memory a distinct stored physical memory segment starting address for at least one segment number received on said segment bus and generating an offset address within each of said physical segments according to the address of the address bus, each of said memory management units further being characterized by controlling the size of said at least one logical memory segment actually used in accordance with the damands of the system, said first memory management unit connected to operate from a lower end of said at least one logical memory segment and expand toward a higher end thereof, said second memory management until connected to operate from said higher end of said at least one logical memory segment and expand toward said lower end, and means responsive to said address bus and connected to said first and second memory management units for enabling only one of said first and second memory management units at a time, said enabling means operating to enable said first memory management unit when the address carried by said address bus is on one side of a break value intermediate of said lower and said higher ends of said at least one logical memory segment, and to enable said second memory management unit when the address carried by said address bus is on the other side of said break value, whereby two variable size

APPENDIX

```
/*
 *   Load the user hardware segmentation
 *   registers from the software prototype.
 *   The software registers must have
 *   been setup prior by estabur.
 */
sureg()
{
        register struct segd *tsp;
        register struct test *tp;
        u.u—dsegd.sg—base = u.u—procp→p—addr + USIZE;
        u.u—ssegd.sg—base = u.u—dsegd.sg—base +
            ((u.u—dsegd.sg—limit & 0377) + 1) — (u.u—ssegd.sg—limit & 03
        if ((tp=u.u—procp→p—textp) != NULL) {
            u.u—tsegd.sg—base = tp→x—caddr;
            tsp = &u.u—tsegd;
        } else {
            tsp = &u.u—dsegd;
        }
        loadsd (mmut, USEG, tsp);
        loadsd (mmud, USEG, &u.u—dsegd);
        loadsd (mmus, USEG, &u.u—ssegd);
        outb (JBREAK, (u.u—break = (u.u—dsegd.sg—limit & 0377) + 1));
        loadsd (mmud, SUTSEG, tsp);
        loadsd (mmus, SUTSEG, tsp);
—outb      PROCEDURE
    ENTRY
        outb    @r7,r16    !* Output the character     *!
        ret                !* Return                   *!
END —outb
```

It is claimed:

1. In a computer system that includes a central processing unit characterized by specifying an address of one of a plurality of memory segments on a segment bus and a particular memory location within the designated physical segments of memory can be controlled within a single logical memory segment.

2. The system according to claim 1, wherein said enabling means includes a register for storing the break value, said register being connected to the central processing unit in a manner that it may be updated by signals from the central processing unit to correspond to the changing logical memory size controlled by one of the first or second memory management units.

3. The system according to claim 1, wherein one of said first and second memory management units is utilized to control stack memory and the other is used to control data memory.

4. The system according to claim 3, wherein said enabling means includes a register containing said break value, said register connected to the central processing unit in a manner to be updated by signals from the central processing unit in response to growth of the data memory.

5. A computer system, comprising:
a central processing unit having address bus terminals,
a random access memory having address bus terminals,
at least first and second memory management units, each of which is characterized by having input terminals adapted to receive logical memory addresses within at least a given segment of addresses with means therein for converting an address within said logical segment into a physical memory address within distinct physical address segments at output terminals thereof,
an address bus having a plurality of conductors, some of which are connected directly between said microprocessor bus terminals and said memory address bus terminals, others of which are connected between remaining central processing unit address terminals and said first and second memory management unit input terminals, and yet others of which are connected from the memory management unit output bus terminals to remaining of said memory address bus terminals, and
means responsive to an address on a plurality of said central processing unit address terminals for enabling either said first or said second memory management unit, but not both, depending upon whether the address is above or below a given break address that is within said given logical segment,
whereby said one logical memory segment is separately accessed through said first and second memory management units.

6. The system according to claim 5, wherein said enabling means comprises means for comparing an address on said plurality of central processing unit address terminals with an address maintained in a register.

7. The system according to claim 6, wherein said enabling means additionally comprises means responsive to a plurality of said central processing unit address bus terminals for updating said predetermined address within said break register.

8. The system according to claim 5 wherein said first memory management unit is connected to respond to addresses beginning at a lower address end of said given logical segment and expand toward a higher address end thereof, and wherein said second memory management unit is connected to respond to addresses beginning at said higher end of said given logical segment and expand toward the lower address end thereof, whereby the full extent of said given logical segment may be utilized on either side of said break address.

9. In a segmented memory computer system having a central processing unit capable of generating logical memory addresses at address bus terminals, an improved system for managing said memory, comprising an address bus means connected between said central processing unit terminals and address terminals of a random access memory and having means in the path of at least a portion of said bus for converting a logical memory address thereon into a physical memory address that is applied to said memory address terminals, said converting means being characterized by responding to logical addresses on one side of a dividing address within at least one given logical segment of addresses to generate a physical address in a first physical segment of addresses and by responding to logical addresses on another side of said dividing address within said given logical segment to generate a physical address in a second physical segment of addresses that is separate and distinct from the first physical segment, whereby said given logical address segment is divided into two distinct physical address segments.

10. The system according to claim 9, which additionally comprises means responsive to said logical addresses for adjusting said logical segment dividing address.

11. The system according to claim 9 wherein said converting means is additionally characterized by responding to addresses on said one side of the dividing address beginning at a lower address end of said given logical segment and expanding toward said dividing address, and by responding to addresses on said another side of the dividing address beginning at a higher end of said given logical segment and expanding toward said dividing address, whereby the full extent of said given logical segment may be utilized on either side of said break address.

* * * * *